Sept. 5, 1939.   J. H. VICTOR ET AL   2,172,325
PLASTIC FLUID SEAL STRUCTURE
Filed March 1, 1937   2 Sheets-Sheet 1

JOHN H. VICTOR
WILLIAM A. HEINZE
WILBURN F. BERNSTEIN
            INVENTORS
PER

ATTORNEY

Sept. 5, 1939.  J. H. VICTOR ET AL  2,172,325
PLASTIC FLUID SEAL STRUCTURE
Filed March 1, 1937    2 Sheets-Sheet 2

JOHN H. VICTOR
WILLIAM A. HEINZE
WILBURN F. BERNSTEIN
        INVENTORS
PER

ATTORNEY

Patented Sept. 5, 1939

2,172,325

UNITED STATES PATENT OFFICE 2,172,325

PLASTIC FLUID SEAL STRUCTURE

John H. Victor, Wilmette, William A. Heinze, Chicago, and Wilburn F. Bernstein, Brookfield, Ill., assignors to Victor Manufacturing & Gasket Company, Chicago, Ill., a corporation of Illinois Application March 1, 1937, Serial No. 128,444

2 Claims. (Cl. 288—3)

This invention relates to an improved plastic fluid seal structure, and has for one of its principal objects the provision of a sealing means for fluids such as oils, greases and the like, which shall be simple of construction, economically produced and superior in operation and lasting qualities. One of the important objects of this invention is to provide a plastic fluid seal structure which is composed of some suitable material such as rubber, leather and, in the case of oils, synthetic rubber, and which will be possessed of improved lasting and sealing qualities.

A further object of the invention is the provision of an oil seal or the like, the packing element of which comprises a molded structure of synthetic rubber or a similar material, the same being encased in a metal shell or retainer in a novel self-locking manner.

Another important object of the invention is the provision in an oil seal or grease retainer of a molded packing element and a metallic housing or shell therefor, which shell shall practically entirely encompass the periphery and sides of the plastic sealing element, thereby providing a neat appearing structure and one which is not liable to become damaged in use or handling.

Another and still further important object of the invention resides in the production of an oil seal and grease retainer or the like which includes a molded packing element or diaphragm, and which diaphragm can be manufactured on a production basis in considerable quantities, while at the same time being available for various sizes of seals to fit housings of different internal diameters.

Another object of the invention is the provision in an oil seal of a packing structure comprised of a plurality of layers or disks of leather, synthetic rubber or the like, each of the disks having a central opening therethrough, but of varying sizes, all however adapted to accommodate a single shaft in sealing relationship therewith.

An additional object is the provision in an oil or fluid seal of a novel diaphragm in the form of a disk, having a central opening therethrough adapted to encompass the rotating shaft, the opening being bounded by a series of parallel flange elements integral with the packing member, and which are adapted to closely fit about the rotating shaft in a flexibly contacting manner.

Other and further important objects of the invention will be apparent from the disclosures in the accompanying drawings and following specification.

The invention, in a preferred form, is illustrated in the drawings and hereinafter more fully described.

Figure 1:
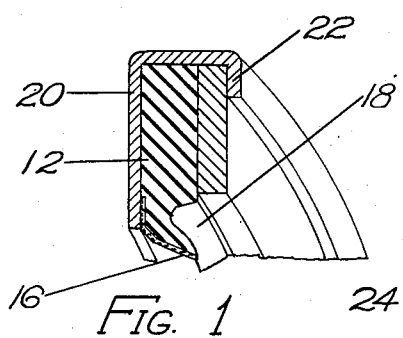
Figure 1 is a sectional view of one of the improved fluid seal structures of this invention, showing the same as removed from a shaft.

The reference numeral 12 indicates generally a packing element, or what might be termed a diaphragm, which comprises one of the essential features of the fluid or oil seals of this invention. These packing elements may be composed of any suitable material, preferably a synthetic rubber, which is of particular advantage in the event that the sealing element is to be used in connection with oils or greases, as these synthetic rubbers are not attacked by such liquids or fluids.

Figure 2:
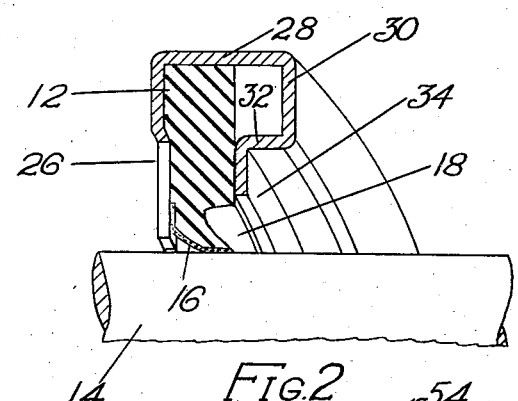
Figure 2 illustrates a sealing element somewhat the same as that shown in Figure 1, portraying the same as applied to a shaft.

This synthetic rubber lends itself particularly to molding operations, and in most instances the surface thereof which comes into actual sealing contact with a rotating shaft, such as that shown in 14 in Figure 2, is reinforced by a lining of fabric or the like, illustrated at 16 in Figures 1 and 2. This fabric is molded with the material of the plastic sealing element 12, and forms a practically integral part thereof, being rather fully impregnated with the synthetic rubber or other material during the molding operation.

It will be noted that the sealing element 12 is formed with a cut-away slot or the like 18, which provides a thin projecting lip adapted for sealing contact with the shaft, and which is normally of an internal diameter somewhat less than the diameter of the shaft for which it is intended. Upon insertion of the shaft, the lip is distorted somewhat into the position shown in Figure 2, thereby affording a satisfactory sealing contact, while at the same time avoiding any tendency to undue friction or burning. It will be further noted that a very fine edge or line of contact is thereby provided, which tends to maintain an additional sealing action against the undesired escape of fluids.

The sealing element itself must ordinarily be positioned in some sort of a housing or shell, such a shell being illustrated at 20 in Figure 1 and comprising essentially a cup-shaped metal container having one flat side and an outer periphery, together with an inturned edge as shown at 22, which edge in turn grips and maintains in desired position a flat washer or the like 24, the washer fitting closely against the corresponding face of the packing element 12. In this manner a unitary structure is provided which can be readily and simply pressed into a housing of corresponding size so that at the same time the inner lip of the sealing element properly contacts the rotatable shaft about which it is fitted.

In Figure 2 a slightly different form of housing is illustrated, this comprising a metal shell or the like having a back comprising radial fingers 26, and a peripheral portion 28 which is of a size adapted to be pressed into a corresponding housing, and in this particular case the peripheral portion is extended and turned downwardly and thence inwardly and again downwardly to provide respectively a face 30, an inturned edge 32, and a packing, gripping and positioning rim 34. A space is provided by this particular construction which may or may not be filled, depending upon the particular usage to which the device is to be put. A substantially leak-proof structure results in either case.

In Figures 3 to 6, inclusive, a slightly different type of sealing element is shown, this of course necessitating a corresponding change in the metal shell or housing.

Figure 3:
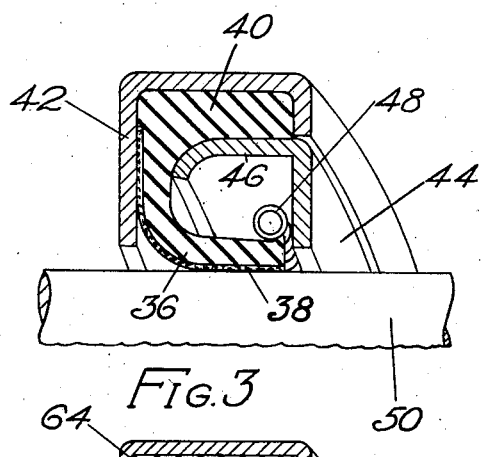
Figure 3 is a sectional view of a somewhat different embodiment of the invention.

These packing elements are, as before, preferably composed of synthetic rubber and comprise essentially a lip or sealing portion 36, as is best shown in Figure 3, having the usual fabric facing 38 molded thereto and also provided with an integral body portion 40, which may or may not be of the same material, it having been found that whereas the lip portion must of necessity be of the more expensive type of synthetic rubber, the body portion can be composed of some cheaper material, all of which, however, can be produced in one mold and in a single operation.

A containing shell 42 is provided, shaped as illustrated and co-operating with the shell is a retainer or reinforcement L-shaped in cross-section, as illustrated, and which includes an outer face 44 and an inner diaphragm and packing element 46, which is curved as shown, so as to correspond quite closely to the contour of the diaphragm itself. It has been found that such a reinforcement or retaining element can be securely retained in desired position by first inserting the same in the molded diaphragm element and then fitting the outer shell 42 thereabout. This places the body material of the diaphragm under compression and effectively prevents, first, any fluid leakage between the parts and, second, the loosening or falling out of the reinforcement 44—46. A garter spring 48 is provided for maintaining a more positive contact between the lip portion 36 and the shaft 50.

Figure 4:
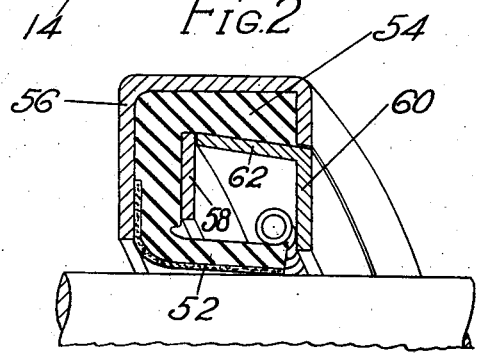
Figure 4 shows a modification of the embodiment of Figure 3.

A modified form of this structure is illustrated in Figure 4, wherein the diaphragm comprises a lip portion 52 and an integral body portion 54 with a containing shell 56, and in this instance a reinforcing structure is provided comprising, first, a flat washer 58 fitted against the inner face of the diaphragm, and, second, a cup-element L-shaped in cross section 60—62, the angle being slightly more than that of a right angle and accordingly first, a slight distortion of the body portion 54 when the same is inserted, and also very positively preventing any loosening or coming out of the internal parts when the outer metal shell 56 has been built into position as one of the last operations on the device.

Figure 5:
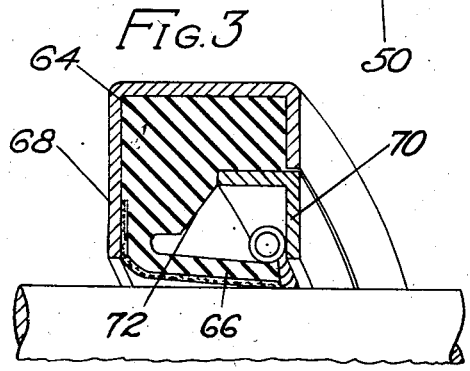
Figure 5 illustrates a further modified form of the invention.

Another embodiment is shown in Figure 5, this being quite similar to that of Figure 4 with the exception that the body portion 64 is somewhat larger with respect to the lip 66 and the outer shell 68 is correspondingly larger, while the inner reinforcing cup 70 is possibly somewhat smaller, but fitted into the structure in about the same manner as the corresponding element of Figure 3. It will be noted, however, that the diaphragm itself is angularly cut away along one face, as illustrated at 72, which provides for a freer action of the lip 66.

Figure 6:
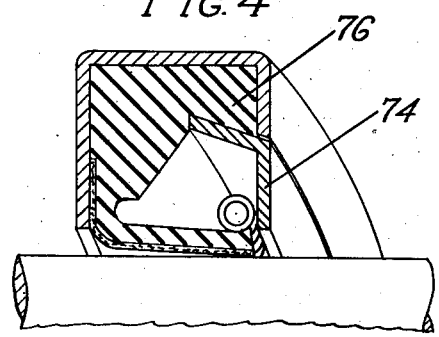
Figure 6 is a modification somewhat along the lines shown in Figure 5.

This embodiment is substantially duplicated in Figure 6, with the exception that the inner reinforcing structure 74 is of an obtuse angle in cross section, necessitating, first, a displacement of the body 66 when same is inserted, and also providing a better sealing relationship between the parts and a preventing of looseness or falling out when the apparatus has been finally assembled.

Figure 7:
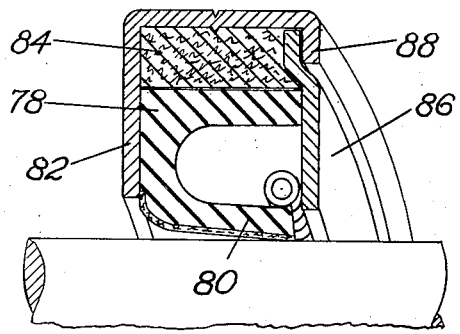
Figure 7 is a sectional view illustrating that type of sealing element which can be used rather uniformly for different sizes of sealing structures.

In Figure 7 a combination body and lip 78—80 is shown, this being quite similar to the structure in Figure 3, but in this event the same is adapted for use in an outer shell or container 82, which may be of varying external diameters, the diaphragm, however, being in each case of the same external diameter. Any discrepancy in size is made up by an inner lining or element 84, which can be of any suitable material, such as a molded ring of synthetic rubber or the like, or possibly of asbestos, leather or some other fibrous material.

A washer 86 is provided, this being held in position by the overturned edge 88 of the main shell portion 82.

Figure 8:
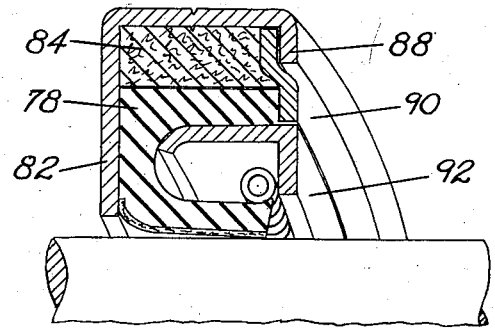
Figure 8 is a modified form of the device of Figure 7.

A somewhat similar structure is indicated in Figure 8, the packing element and filling being indeed the same as shown at 78 and 84 respectively, and an outer shell 82—88 being also duplicates of Figure 7. However, the washer 86 is replaced by two elements, one being a corresponding washer 90 having a central opening of larger internal diameter, and into this opening and against the packing is fitted an L-shaped retainer structure 92, which is quite similar to the structure 44 illustrated in Figure 3. Obviously, other embodiments of this combination retainer and reinforcing structure may be employed, such as those illustrated in Figures 4 to 6, inclusive.

Figure 9:
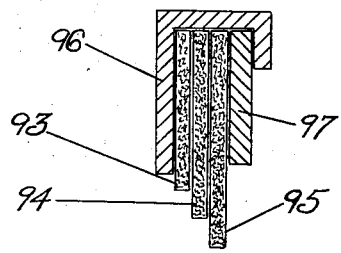
Figure 9 is a sectional view of a further embodiment, showing the device as removed from a shaft.
Figure 10:
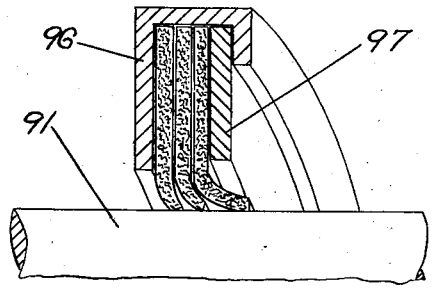
Figure 10 shows the device of Figure 9 on a shaft.

In Figures 9 and 10 is illustrated another form of the invention, wherein a plurality of flat washers of leather or the like are built into a single structure, these washers having central openings of different internal diameters, as shown at 93, 94 and 95, respectively. The same are encased in a shell 96 and held in position by means of the washer 97.

In Figure 10 the device is shown as applied to a shaft 91, and it will be seen that a different degree of bend is imparted to the corresponding leather or other washer elements.

Figure 11:
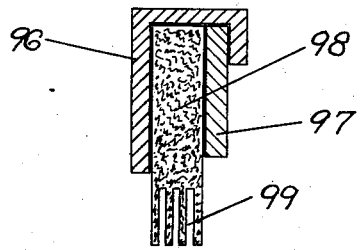
Figure 11 is a further modification.

A further modification of this is illustrated in Figure 11, where the leather or other packing element is made in one piece 98, and has a plurality of notches or grooves 99 formed in its internal edge, thereby producing a series of relatively thin and quite flexible shaft contacting portions, which will act in a good deal the same manner as the corresponding elements illustrated in Figure 10.

Figure 12:
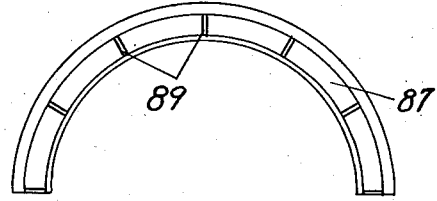
Figure 12 is a plan view of an additional form of seal.
Figure 13:
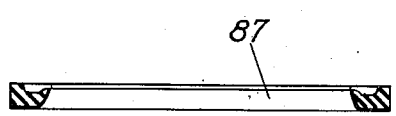
Figure 13 is a sectional showing of the device of Figure 12.

In Figures 12 and 13, the sealing element 87 is shown as composed of molded synthetic rubber or the like and made in two semi-circular sections whereby the same can be fitted around a shaft which is already in position in a portion of a housing, and after which a complementary half of the sealing element and the housing can be added to the structure. Reinforcing ribs 89 are spaced at desired regular intervals about the periphery of the sealing element.

Figure 14:
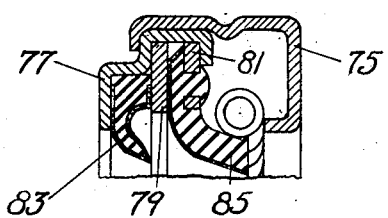
Figure 14 illustrates a double form of sealing structure.

In Figure 14 is shown a double form of fluid seal adapted for certain extraordinary conditions, the same including a pair of sealing elements 83 and 85 which may be of various types, the element 83 being somewhat similar to that shown at 12 in Figure 1 but with the added feature of having the fabric coating or covering extending over both faces of the flexible lip where the possibility of the same becoming torn loose during the process of installation is eliminated. The sealing element 85 is of a different type, the same being of synthetic rubber molded into a metallic washer support 81, and the two flexible diaphragms or sealing elements are then held in a containing housing or support including interfitted metal shells 75 and 77 and a spacing washer 79. Obviously, the double construction can be varied so far as the diaphragm and also the metallic parts are concerned in order to meet various and different requirements.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

1. A plastic fluid seal structure, including a main annular body portion of moldable material and a flexible lip portion integral with the body portion, said annular body portion being channel-shaped in cross-section, thereby defining a distinct line of demarkation between the body and the lip, and a metal housing for the sealing element, said housing comprising a cup-shaped shell with an integral inturned rim substantially enclosing the body portion, and an auxiliary shell L-shaped in cross-section, having one leg fastened in the channel portion under compression of the body portion, and a flat washer in the bottom of the channel acting against said auxiliary shell.

2. A plastic fluid seal structure, including an annular body having a central opening therethrough, a channel-shaped groove in the body adjacent the opening, said groove thereby defining a relatively thin and flexible lip, the main body portion, excluding the lip, being substantially in the shape of a right angle triangle in cross-section, and a metal housing for the body, said housing contacting same on those sides at right angles to each other, together with a reinforcing element for the body and housing, said reinforcing element fitted into the channel-shaped portion of the body under compression.

JOHN H. VICTOR.
WILLIAM A. HEINZE.
WILBURN F. BERNSTEIN.